United States Patent
Renshaw

(10) Patent No.: US 8,079,545 B2
(45) Date of Patent: Dec. 20, 2011

(54) SYSTEM, METHOD AND APPARATUS FOR GROUND-BASED MANIPULATION AND CONTROL OF AERIAL VEHICLE DURING NON-FLYING OPERATIONS

(75) Inventor: Kevin J. Renshaw, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 949 days.

(21) Appl. No.: 12/006,995

(22) Filed: Jan. 8, 2008

(65) Prior Publication Data
US 2009/0045283 A1  Feb. 19, 2009

Related U.S. Application Data

(60) Provisional application No. 60/884,544, filed on Jan. 11, 2007.

(51) Int. Cl.
*B64C 25/50* (2006.01)

(52) U.S. Cl. .......................................................... 244/50

(58) Field of Classification Search .................... 244/50; 180/14.1, 14.2, 14.6, 16.7
See application file for complete search history.

(56) References Cited

U.S. PATENT DOCUMENTS

| | | | | |
|---|---|---|---|---|
| 2,920,845 A | * | 1/1960 | Palmiter | 180/19.3 |
| 3,443,453 A | | 5/1969 | Thompson | |
| 3,937,290 A | * | 2/1976 | Benning | 180/14.7 |
| 4,008,868 A | | 2/1977 | Berg | |
| 4,470,564 A | * | 9/1984 | Johnson | 244/50 |
| 6,264,146 B1 | | 7/2001 | Hill | |
| 2004/0094663 A1 | * | 5/2004 | McVaugh | 244/50 |
| 2006/0097106 A1 | * | 5/2006 | MacGregor et al. | 244/50 |
| 2006/0255555 A1 | * | 11/2006 | Lindahl | 280/92 |

OTHER PUBLICATIONS

Fulghum, David A., et al., Boeing Reveals Details of X-45N Recon/Bomber Design, Aviation Week & Space Technology, p. 47, Jun. 4, 2007.
European Search Report (EP 08 15 0193); Dated Oct. 7, 2011; Reference: JDM/P418023EP; Application No./Patent No. 08150193.4-2422/2078672; Applicant/Proprietor: Lockheed Martin Corporation.

\* cited by examiner

*Primary Examiner* — Tien Dinh
(74) *Attorney, Agent, or Firm* — Bracewell & Giuliani LLP

(57) ABSTRACT

A device for controlling an aircraft during non-flying operations has a retractable tiller that extends with the nose landing gear of the aircraft. Ground crew use the control device to maneuver the aircraft for various ground-based operations. The tiller provides left and right directional input to the steering of the nose wheel. The tiller also provides throttle and brake controls, such as a twist-grip handle on the tiller. The throttle and brake controls are spring-loaded to an engine idle and braked position. Separate brakes also may be provided for additional braking control. The control device also includes various auxiliary controls for additional operations such as wing fold, tail hook extension and retraction, launch bar extension and retraction, etc. Other functions including engine start, engine shutdown, a vehicle system built in test and other functions and tests also may be provided on the control device.

23 Claims, 1 Drawing Sheet

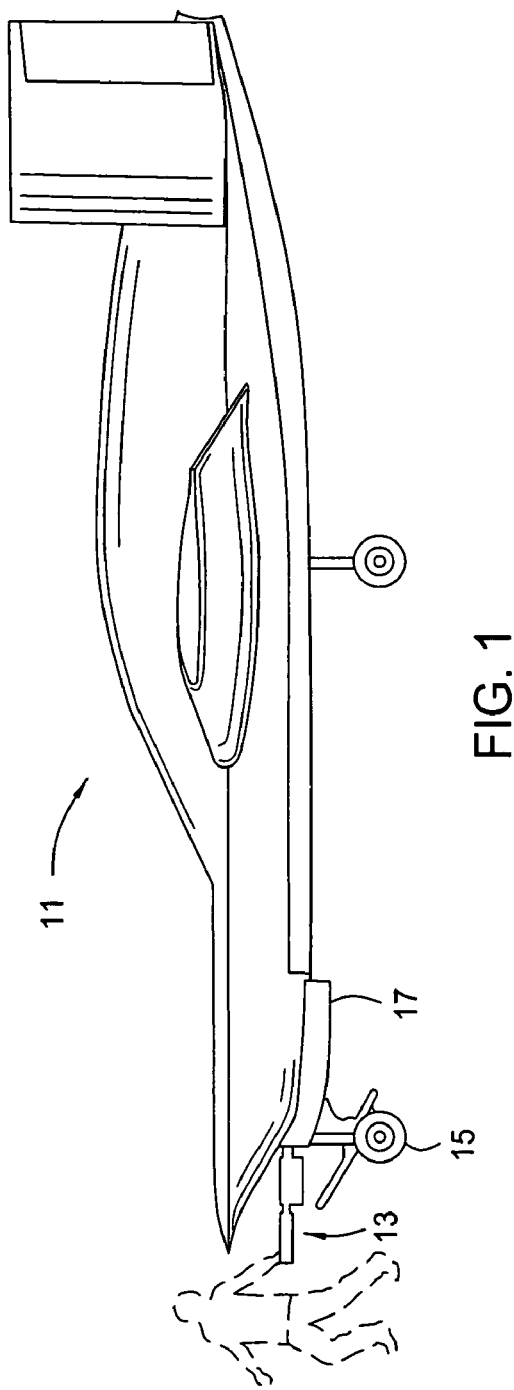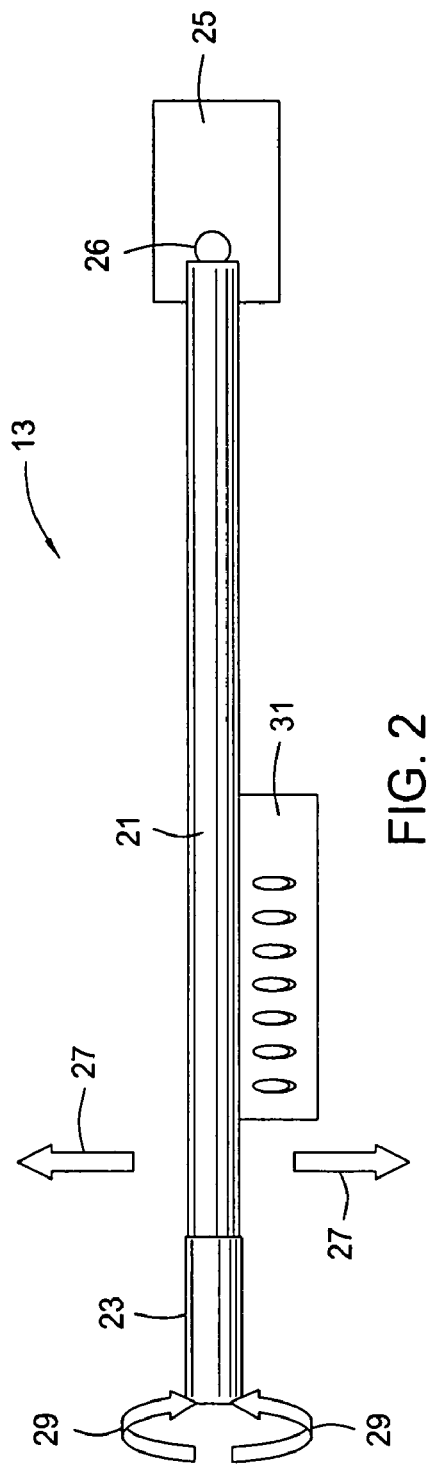

(12) United States Patent

SYSTEM, METHOD AND APPARATUS FOR GROUND-BASED MANIPULATION AND CONTROL OF AERIAL VEHICLE DURING NON-FLYING OPERATIONS

This non-provisional patent application claims priority to and the benefit of U.S. Provisional Pat. App. No. 60/884,544, filed on Jan. 11, 2007.

TECHNICAL FIELD

The present invention relates in general to aircraft and, in particular, to an improved system, method, and apparatus for controlling, repositioning, and maneuvering aerial vehicles while they are not flying.

DESCRIPTION OF THE RELATED ART

The United States Air Force and Navy have interest in operating unmanned aerial vehicles (UAV). There are a variety of systems for guiding UAVs during flight. However, once a UAV is on the ground (i.e., not flying), it is also necessary to safely taxi it, move it around parking areas, and reposition it in a manner similar to how manned aircraft are relocated. These operations are particularly difficult to perform on the deck of an aircraft carrier at sea. For example, a Navy UAV must move out of the landing area after a successful arrested landing on a carrier, be relocated (i.e., "spotted") at various places on the deck, and steered precisely into the launching catapult station. Worse yet, there is very little space on an aircraft carrier deck for mistakes or divergence from desired taxi paths.

There have been a few proposed solutions for control or guidance systems for operating UAVs while they are on the ground. For example, several solutions using wireless remote control devices have been proposed to steer UAVs while they are on the ground. These devices suggest the use or either RF or IR signals to be transmitted from dedicated units. The devices may be carried by ground personnel or located in a control station. Hard-wired control devices that would be directly connected to UAVs also have been proposed. However, all of these systems are still experimental and none are currently in service.

Unfortunately, remote control units such as those described above are susceptible to interference and loss of signal, which would lead to a loss of control of the UAV. Operations on an aircraft carrier present specific problems with a high RF energy level on the deck of the carrier and with adverse weather potentially interfering with IR signals. One of the most significant problems with remote control of a UAV on a carrier deck is that precise steering of a UAV from a remote station is difficult. Precisely positioning a UAV on an aircraft carrier catapult would be very difficult with remote control systems, especially given the required degree of precision needed to engage the tow bar into the launch catapult shuttle.

In addition, if the UAV lands at any other location (e.g., an alternate base) where the ground control equipment is not available, the only way to move the UAV would be with a tow vehicle. Thus, although each of these prior art systems is workable, an improved solution that overcomes the limitations and problems associated with the prior art would be desirable.

SUMMARY OF THE INVENTION

Embodiments of a system, method, and apparatus for controlling an aircraft during non-flying operations are disclosed. The invention is well-suited for use with unmanned aerial vehicles. The aircraft is provided with a retractable ground operations control device that extends with the landing gear. Alternatively, the control device may be deployed from a separate bay on the aircraft. The control device may comprise a tiller that protrudes from the front of the aircraft or other location on the aircraft as dictated by the configuration of the aircraft. Ground crew use the control device to maneuver the aircraft for various ground-based operations.

The tiller provides left and right directional input to the steering of the nose wheel. The tiller also provides throttle and brake controls, such as a twist-grip handle on the tiller. The throttle and brake controls are spring-loaded to an engine idle and braked position. Separate brake functions also may be provided for additional braking control. The control device also includes various auxiliary controls for additional operations such as wing fold, tail hook extension and retraction, launch bar extension and retraction, etc. Other functions including engine start, engine shutdown, a vehicle system built in test and other functions and tests also may be provided on the control device.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

FIG. 1 is a side view of one embodiment of an aircraft constructed in accordance with the present invention; and FIG. 2 is a top view of one embodiment of a control device for the aircraft of FIG. 1 and is constructed in accordance with the present invention.

DETAILED DESCRIPTION OF THE INVENTION

Referring to FIGS. 1 and 2, embodiments of a system, method, and apparatus for controlling an aircraft, such as an unmanned aerial vehicle (UAV) 11, during non-flying operations are disclosed. The UAV 11 is provided with a ground operations control device 13 that may be both retractable and mechanical, electrical or hydraulic, depending on the application. In one embodiment, the control device 13 is separate and independent from any other controls employed by the aircraft to control its operation during flight. The control device 13 may be extended with the landing gear 15 (e.g., nose landing gear or NLG), such as from the bay 17 of the NLG on the UAV 11, such that it is immediately deployable and usable during any non-flying operations (e.g., operations occurring on the ground at ground speeds of a walking speed or less).

The control device 13 may comprise a bar or tiller 21 (FIG. 2). In the embodiment shown, the tiller 21 protrudes from the front of the aircraft on or off of the centerline (e.g., in top view). In this position, a ground crewman may use the control device 13 to "lead" and control the UAV 11 for various ground-based operations. The tiller 21 may be attached to a steering control 25 (e.g., sensor, valve, etc.) via a pivot 26 that provides direct directional inputs (see, e.g., arrows 27, indicating left and right directions) to the steering of nose wheel 15 (FIG. 1) or differential braking of the main wheels.

The control device 13 also may be equipped with throttle and brake controls 23. In one embodiment, the throttle and brake controls 23 are combined in a single motorcycle-style, twist-grip handle on the tiller 21 (see, e.g., arrows 29, indicating clockwise and counter-clockwise rotation thereof). The throttle and brake controls 23 may be spring-loaded to an unbiased, engine idle position. Thus, release of the throttle 23 would return it to the engine idle position and activate the wheel brakes for the UAV 11. A separate brake handle also may be provided for separate and/or additional braking control (e.g., differential braking of left or right side brakes).

The control device 13 may further include various auxiliary controls 31 (e.g., switches). Such controls 31 may be provided for operations such as wing fold, tail hook extension and retraction, launch bar extension and retraction, etc. Other functions including engine start, engine shutdown, a vehicle system "built in test" (BIT) and other functions and tests also may be provided on the control device 13.

For aircraft carrier operations, the control device 13 may be extended with the landing gear 15, but would be inactive while the UAV 11 is in flight. On touchdown and after the UAV 11 has come to a stop following an arrested landing, a ground control crewman approaches the UAV 11 and activates the control device 13 to taxi the UAV 11 out of the landing zone. The control device 13 may be used to fold the wings of the UAV 11 at the same time. The steering, throttle, and brake functions on the control device 13 allow the crewman to accurately and precisely taxi the UAV 11 to its assigned parking spot and then shut down the engine.

For launch, the ground crewman may use the control device 13 to start the engine of the UAV 11 and perform BIT. The tiller 21 may then be used to taxi the UAV 11 to the catapult on the aircraft carrier. The throttle and brake controls 23 are used to move and stop the UAV 11 as required during taxi. The location of the tiller 21 and ground crewman on or near the centerline immediately in front of the NLG 15 makes it simple to walk the UAV 11 along the centerline of the catapult and position the NLG 15 in the correct position over the catapult shuttle. The auxiliary controls 31 on the tiller 21 also may be used to extend the launch bar to engage the catapult shuttle. After launch, the entire control device 13 may be retracted into either the NLG bay 17, or into a dedicated storage volume in the UAV 11.

The invention also may be incorporated into manned (i.e., piloted) aircraft for moving them on the ground or on a carrier deck in a similar manner as that described above for UAVs. Currently to reposition a parked manned aircraft on the ground, a crewman is put in the cockpit to operate the brakes and, in some cases, the steering while an external tow cart provides the motive force and steering by mechanically moving the nose wheel steering via the tow bar. Thus, the current method to move an aircraft on the ground without a pilot in the cockpit requires a minimum of two people and ground tow equipment.

In contrast, the invention allows a single person to move an unpiloted aircraft with no one in the cockpit (i.e., an "unmanned" manned aircraft) since brake, throttle, and steering control would be provided at the control device 13. The aircraft engine provides motive force instead of requiring a tug, and the crewman operates the control device 13 to manage engine thrust and aircraft braking. As described above, the control device 13 may be stowed in the NLG bay 17 of the aircraft or in a separate, dedicated bay. The invention is well suited for both military and commercial aircraft.

The invention also may be used to position unpiloted or piloted aircraft into the catapult shuttle on an aircraft carrier. This is a helpful advantage of the invention since, typically, pilots cannot see the catapult engagement point from the cockpit. Conventional systems for launching such piloted aircraft requires a ground crewman to communicate with the pilot in the cockpit via use hand signals to indicate distance and steering commands. With the control device 13 installed on a piloted aircraft, the ground crewman steers the aircraft into position while looking directly at the shuttle and launch bar. This design eliminates the possibility of misunderstood communications between ground crew and pilots.

The invention has numerous advantages as disclosed herein. For example, the controls are attached to directly to and cannot be separated from the aircraft. Thus, the controls are available for use by ground crew at any location or base at which the aircraft is located. The use of a hands-on tiller with throttle, brake, and steering functions on or near the centerline of the UAV enables the operator to work in close proximity to the UAV for precise guidance inputs. The operator also has a direct link to the controls and is not subject to RF or IR interference. The control device of the invention is set to return to a stopped position (e.g., the throttle moves to idle, and the brakes are applied) if the operator releases the control device.

The invention described also may be retrofitted to existing UAVs or manned aircraft in an externally mounted pod or package to enable ground control of those vehicles. The control bar would be retracted and stowed in such a pod when the vehicle is in flight. Suitable wiring and control interfaces would be incorporated into the vehicle to transmit signals from the control bar to the primary systems of the vehicle.

While the invention has been shown or described in only some of its forms, it should be apparent to those skilled in the art that it is not so limited, but is susceptible to various changes without departing from the scope of the invention. For example, although the invention has been described in conjunction with a UAV, it also may be used in conjunction with any type of aircraft (e.g., fixed wing, rotary wing, etc.) or other types of vehicles, devices or machinery (e.g., such as land-based vehicles or equipment, water-borne vessels or equipment that may require repositioning maneuvers.

What is claimed is:

1. An aircraft, comprising:
   an aircraft body having flight controls for controlling flight operations of the aircraft; and
   a ground operations control device mounted to the aircraft body to start an engine of the aircraft and to maneuver the aircraft strictly during non-flying operations, such that the ground operations control device is separate and independent from the flight controls, and the ground operations control device is inactive during flight of the aircraft.

2. An aircraft according to claim 1, wherein the ground operations control device is retractable.

3. An aircraft according to claim 1, wherein the ground operations control device provides at least some direct mechanical control of the aircraft.

4. An aircraft according to claim 1, wherein the ground operations control device is extended with the landing gear.

5. An aircraft according to claim 4, wherein the ground operations control device extends and retracts with a nose landing gear, and is located in a bay of the nose landing gear during flight of the aircraft.

6. An aircraft according to claim 1, wherein the aircraft is an unmanned aerial vehicle.

7. An aircraft according to claim 1, wherein the ground operations control device comprises a tiller that protrudes from a front portion of the aircraft body and is adjacent a centerline of the aircraft body.

8. An aircraft according to claim 1, wherein the ground operations control device is attached to a steering control via a pivot that provides direct left and right directional inputs to a steering of a nose wheel of the aircraft.

9. An aircraft according to claim 1, wherein the ground operations control device has throttle and brake controls comprising a combined, single motorcycle-style, twist-grip handle providing clockwise and counter-clockwise rotation for applying throttle and braking functions.

10. An aircraft according to claim 9, wherein the throttle and brake controls are spring-loaded to an unbiased, engine idle position such that release of the throttle and brake controls return the aircraft to an engine idle position and activate wheel brakes of the aircraft.

11. An aircraft according to claim 9, further comprising a separate brake handle for separate and additional braking control of the aircraft, including differential braking of left and right side brakes.

12. An aircraft according to claim 1, wherein the ground operations control device further comprises auxiliary controls for operations including wing fold, tail hook extension and retraction, launch bar extension and retraction, engine start, engine shutdown, and a vehicle system built in test (BIT).

13. An aircraft, comprising:
an aircraft body having flight controls for controlling flight operations of the aircraft; and
a ground operations control device mounted to the aircraft body for maneuvering the aircraft strictly during non-flying operations, such that the ground operations control device is separate and independent from the flight controls, and the ground operations control device is inactive during flight of the aircraft; wherein
wherein the ground operations control device has engine throttle and brake controls.

14. An aircraft according to claim 13, wherein the ground operations control device is retractable.

15. An aircraft according to claim 13, wherein the ground operations control device provides at least some direct mechanical control of the aircraft.

16. An aircraft according to claim 13, wherein the ground operations control device extends and retracts with a nose landing gear, and is located in a bay of the nose landing gear during flight of the aircraft.

17. An aircraft according to claim 13, wherein the aircraft is an unmanned aerial vehicle.

18. An aircraft according to claim 13, wherein the ground operations control device comprises a tiller that protrudes from a front portion of the aircraft body and is adjacent a centerline of the aircraft body.

19. An aircraft according to claim 13, wherein the ground operations control device is attached to a steering control via a pivot that provides direct left and right directional inputs to a steering of a nose wheel of the aircraft.

20. An aircraft according to claim 13, wherein the engine throttle and brake controls comprises a combined, single motorcycle-style, twist-grip handle providing clockwise and counter-clockwise rotation for applying throttle and braking functions.

21. An aircraft according to claim 20, wherein the throttle and brake controls are spring-loaded to an unbiased, engine idle position such that release of the throttle and brake controls return the aircraft to an engine idle position and activate wheel brakes of the aircraft.

22. An aircraft according to claim 20, further comprising a separate brake handle for separate and additional braking control of the aircraft, including differential braking of left and right side brakes.

23. An aircraft according to claim 13, wherein the ground operations control device further comprises auxiliary controls for operations including wing fold, tail hook extension and retraction, launch bar extension and retraction, engine start, engine shutdown, and a vehicle system built in test (BIT).

* * * * *